May 16, 1967  F. B. HARVATH  3,319,375
YELLOW JACKET TRAP

Filed July 26, 1965  3 Sheets-Sheet 1

INVENTOR.
FRANK B. HARVATH
BY
*Richard R. Walling*
ATTORNEY

INVENTOR.
FRANK B. HARVATH
ATTORNEY

May 16, 1967     F. B. HARVATH     3,319,375
YELLOW JACKET TRAP

Filed July 26, 1965     3 Sheets-Sheet 3

INVENTOR.
FRANK B. HARVATH
BY
ATTORNEY

United States Patent Office 3,319,375
Patented May 16, 1967

3,319,375
YELLOW JACKET TRAP
Frank B. Harvath, 6028 St. Clair Ave.,
Cleveland, Ohio 44103
Filed July 26, 1965, Ser. No. 474,584
19 Claims. (Cl. 43—118)

This invention relates to insect traps and more particularly to insect traps for trapping and killing wasps such as yellow jackets.

The trapping and killing of yellow jackets has always been a laborious, uncertain, and frustrating operation. Prior traps have proved ineffective because they are difficult to service and maintain, and are most uncertain in effecting instant death to yellow jackets. Additionally, prior traps, at best, are effective for killing only a small percentage of the total number of yellow jackets in a given area or nest.

Therefore, it is an object of the present invention to provide a baitless yellow jacket trap that is effective in killing practically all yellow jackets in a given area or nest.

A further object of the invention is to provide a yellow jacket trap that is easy to service and clean.

A further object of the invention is to provide a yellow jacket trap that may be easily placed over or on top of a yellow jacket nest on hilly terrain or steep slope.

A further object of the invention is to provide a yellow jacket trap that is simple in construction, inexpensive to manufacture, and highly effective in operation.

Briefly, the foregoing objects are accomplished by the provision of a yellow jacket trap which, in the preferred form, includes a screened enclosure having a bottom access opening through which the yellow jackets enter the trap. Interiorly, the enclosure contains at least one tray or receptacle of insecticide (preferably kerosene) and at least one deflector means disposed above the tray whereby the yellow jackets fly against the deflector means and are deflected into the tray of kerosene where they are killed—kerosene being instant death to yellow jackets. The deflector means may take the form of an inverted funnel secured to the roof of the enclosure, said funnel also serving as a means for filling the tray therebelow with kerosene. An upright funnel may be placed on top of the inverted funnel and connected thereto to facilitate the filling operation. A dust cover may be placed over the top of the upright funnel to prevent the yellow jackets from escaping from the trap and to keep the rain water from entering the trap. A plurality of trays of kerosene may be used at different levels interiorly of the trap to increase the surface area of insecticide available for receiving yellow jackets. If more than one tray is used, the trays may be connected by a series of overflow pipes or channels whereby the overflow from the top tray will lead into the immediate lower tray, etc., thereby effecting the filling of all trays simply by pouring kerosene into the top tray. Auxiliary adjustable leg means may be provided to enable the trap to be set on a hillside of steep slope. A transparent window may be placed in the roof of the enclosure to function as an observing window and to provide a top light attraction means to attract yellow jackets into the trap.

In practice, the trap is set over or on top of a yellow jacket nest (preferably at night to avoid getting stung) whereby the trap opening is disposed immediately adjacent the nest opening. In this manner, yellow jackets will fly directly from the nest and into the trap (without the use of bait) where they will be deflected in flight off of the funnel, and into the tray or trays of kerosene. Yellow jackets which may initially miss entering the trap opening will invariably try to enter again once they see yellow jackets interiorly of the trap, as it is characteristic of yellow jackets to assemble in a common place and help each other out.

Other objects and advantages of the invention will be apparent from the following description taken in conjunction with the drawings wherein.

Although the invention is shown and described herein with reference to a trap for killing yellow jackets, it will be understood that it may be used for trapping and killing other types of insects.

Figure 4:
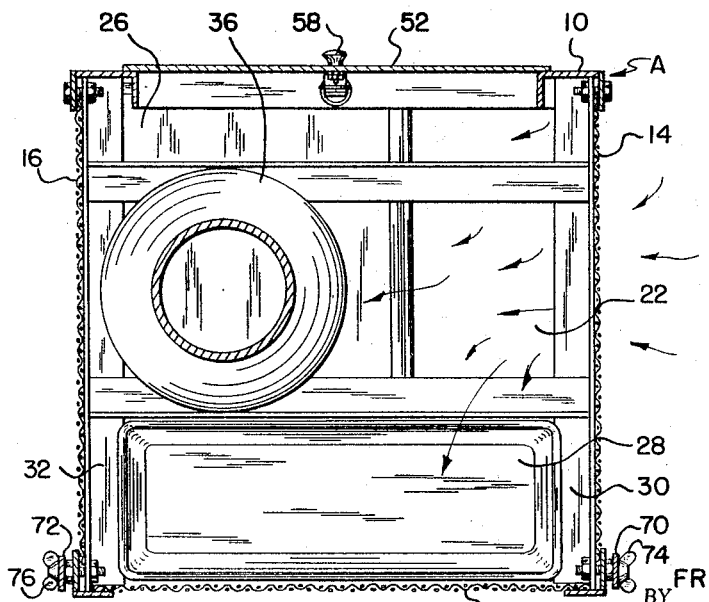
FIG. 4 is a top sectional view taken along the line 4—4 of FIG. 3.

Referring to the drawings, there is shown a yellow jacket trap of the invention in the form of a rectangular-shaped screened enclosure generally designated as A. The enclosure A is supported on four legs 6, 7, 8 and 9. The enclosure A also includes a front-side wall 10, rear-side wall 12, left-side wall 14, right side wall 16, roof 18, and a floor 20. The floor 20 contains a lower disposed opening 22 (FIG. 4) for admitting yellow jackets 23 into the trap interior in a manner to be hereinafter explained. Handles 24 and 25 are provided at the top of the trap for ease in carrying the same.

The enclosure A contains a plurality of trays of liquid insecticide disposed at different levels interiorly of the trap. The tray 26, for example, is disposed on the floor 20, and the tray 28 is disposed somewhat higher in the trap and is supported by the cross-beams 30 and 32. In the preferred form, the liquid insecticide in the trays is kerosene, such being instant death to yellow jackets when in contact therewith. Turpentine and common household bleach are also effective. Although only two trays 26 and 28 are shown and described, it will be understood that any number of trays of insecticide may be employed at various levels within the trap to provide additional exposed surface of liquid insecticide to catch the yellow jackets.

Suitable coacting deflecting or deflector means for deflecting yellow jackets, in flight, into the trays of insecticide are provided in the form of the inverted coacting funnel 36 which is space dfrom the trays and is secured to and extends through the roof 18. A second (upright) funnel 38 is secured to the funnel 36 in coacting relation therewith, as shown, to provide a pouring spout to fill the tray or trays therebelow with liquid insecticide. The funnel 38 may be provided with a detachable dust cover 40 to keep rain water and dust from entering the funnels and falling onto the trays, and to keep yellow jackets from escaping from the trap via the funnels.

The front wall 10 contains an opening 50 to provide access to the trap interior for cleaning and servicing the same. The opening 50 is selectively covered by the access door 52 which is hinged to the lower edge of such opening by the hinges 54 and 55 such that the door swings outwardly and downwardly in a vertical plane. A bias means such as a spring 56 is secured at one end near the top of the door and at its other end to a point inside the lower edge of the opening 50 to retain the door in closed position when not used. The door 52 is provided with the usual handle or knob 58.

Figure 1:
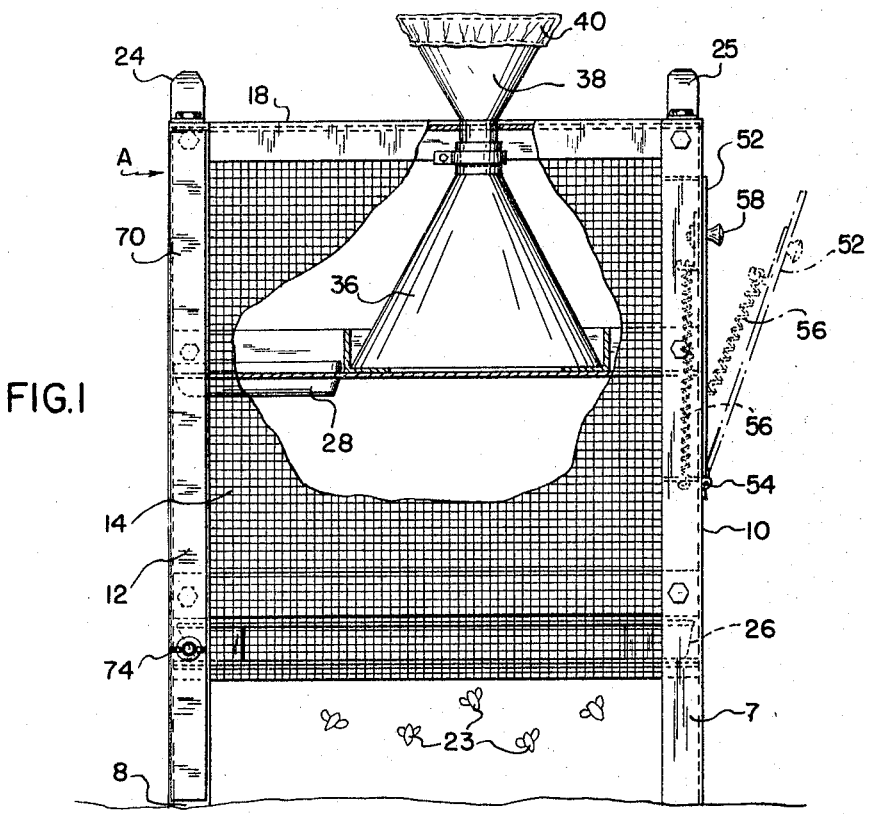
FIG. 1 is a side elevational view of a yellow jacket trap constructed in accordance with the invention, with a portion of the left side wall screen being broken away to show interior portions of the trap, and showing in dot-dash lines the front access door in open position.
Figure 2:
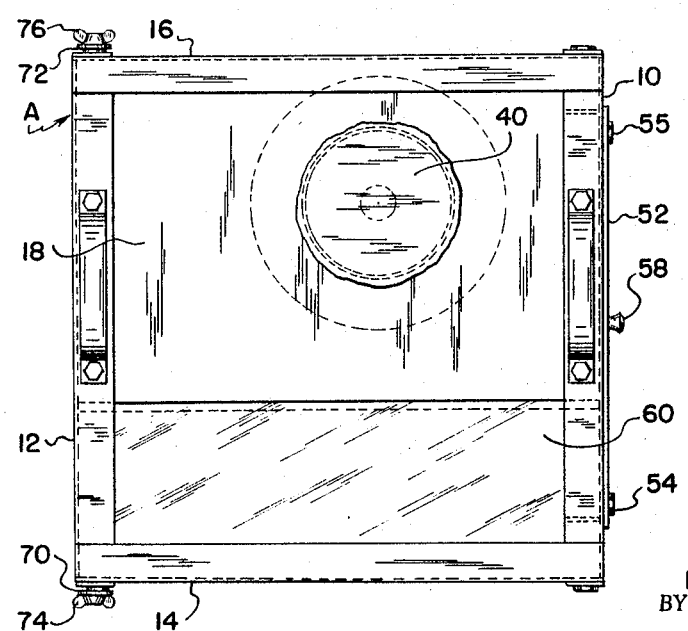
FIG. 2 is a top plan view of the trap shown in FIG. 1.

The roof 18 may be provided with a window 60 (FIG. 2) to enable yellow jackets exteriorly of the trap to see yellow jackets interiorly of the trap. This feature, along with the screening of all four sides of the trap, is imperative as it has been found that yellow jackets try to help each other out and aid each other when in trouble. Thus, yellow jackets outside of the trap see and hear yellow jackets interiorly of the trap in distress and then enter the trap to help them. Once the yellow jackets are within the trap, they will invariably strike the deflecting means and be deflected onto the trays of kerosene where they will be instantly killed.

Figure 3:
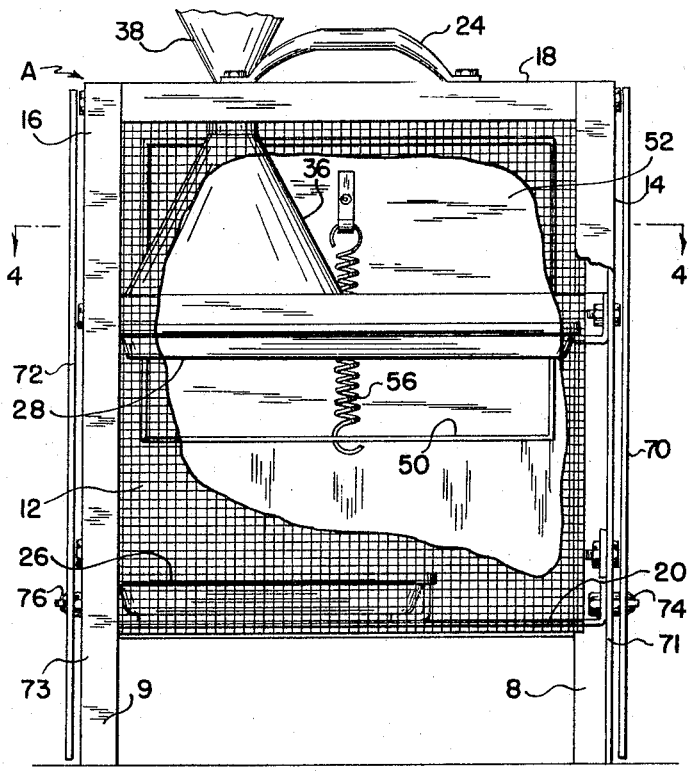
FIG. 3 is a rear elevational view of the trap shown in FIG. 1 with a portion of the rear wall screen being broken away to show interior portions of the trap.
Figure 5:
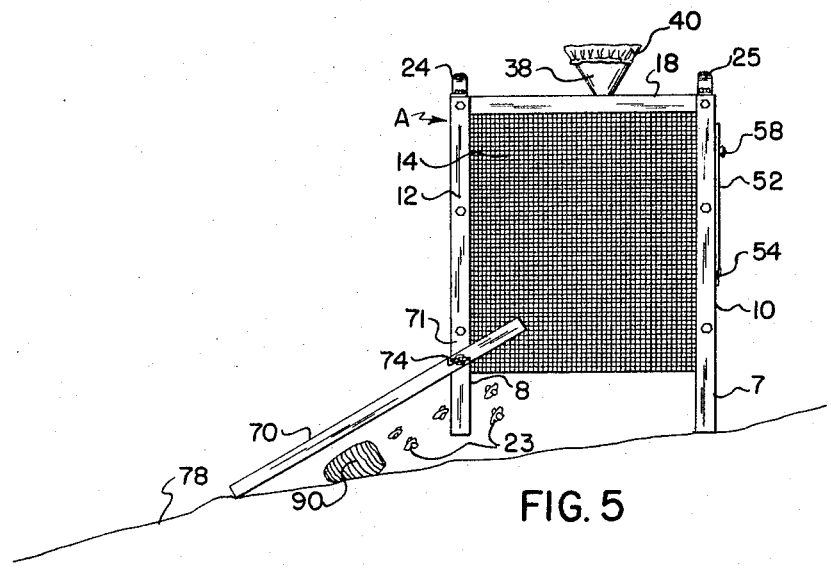
FIG. 5 is a reduced side elevational view of the trap shown in FIG. 1 and showing the trap in operative position on a hillside.

Disposed in conjunction with the back wall 12 are trap mounting means in the form of a pair of spaced rotatably adjustable legs 70 and 72. The leg 70 is rotatably bolted to a corner 71 of the trap at a point adjacent one of its ends by the wing nut and bolt 74. The leg 72 is rotatably bolted to the corner 73 of the trap at a point adjacent one of its ends by the wing nut and bolt 76. Thus, the legs are mounted on the trap in rotative parallel spaced coacting relation for rotative movement in respective vertical planes at right angles to the side of the trap between said corners. In practice, the wing nuts are loosened and the legs 70 and 72 are rotated outwardly and downwardly of the trap from the inactive or stored position shown in FIG. 3 to the vertical rotative position shown in FIG. 5, for example, after which the wing nuts are tightened, thereby enabling the trap to be maintained in level position on the hillside or slope 78.

Figure 6:
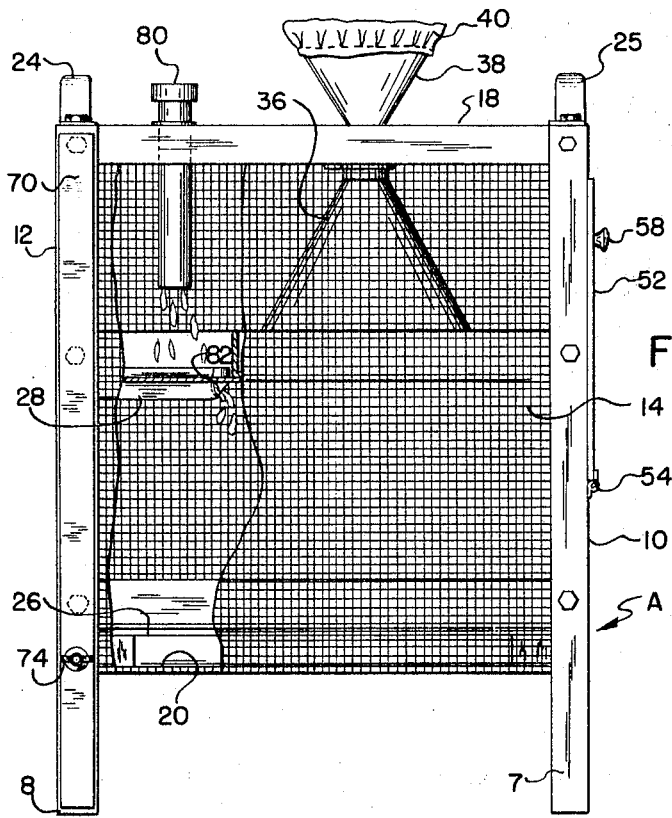
FIG. 6 is a side elevational view of the trap shown in FIG. 1 and showing a modification thereof, with the side wall screen being broken away to show interior portions of the trap.

Referring to FIG. 6, the trap A is provided with an auxiliary filling or pouring spout 80 to fill the tray 28 with liquid insecticide. The tray 28, in turn, is provided with a liquid conduit means or overflow pipe 82, which leads into the lower tray 26. Thus, by pouring liquid insecticide into the spout 80, all trays may be filled. It will be understood that any number of trays may be thus filled from the overflow pipe of the tray immediately above, such trays and overflow pipes being so positioned that all trays are filled from the spout 80 only.

In practice, the trap is placed over a yellow jacket hive or nest 90 so that the trap entrance opening 22 is immediately adjacent the hive opening. This is preferably done at night to avoid getting stung. Yellow jackets invariably will fly out of their hive, enter the trap through the opening 22, be deflected off the funnel or the sides or roof of the trap and into the trays of kerosene where they will be instantly killed.

The invention also contemplates a method of killing yellow jackets, namely, providing a screened enclosure having an entrance opening 22 for receiving yellow jackets, placing the enclosure over a yellow jacket nest whereby the enclosure opening is over the nest entrance, providing a plurality of trays of insecticide interiorly of the enclosure, and providing deflector means interiorly of the enclosure to deflect the yellow jackets in flight into the trays of insecticide.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

I claim:
1. A yellow jacket trap for trapping and killing yellow jackets comprising, a screened enclosure having a lower disposed opening for admitting yellow jackets, at least one tray of liquid insecticide disposed interiorly of the enclosure for receiving the yellow jackets therein, and upstanding deflector means interiorly of the enclosure and disposed in preselected spaced relation to the opening and adjacent to at least one of the trays of insecticide for deflecting the yellow jackets in flight from the opening and thence into one of said plurality of trays of insecticide.

2. The structure of claim 1 wherein said deflector means includes a funnel disposed in inverted position above at least one of said trays.

3. The structure of claim 2 wherein said funnel is secured to and extends through the top of the enclosure and a second funnel is secured in upright position to the first-named funnel to provide a pouring spout for filling the tray therebelow with insecticide.

4. The structure of claim 3 wherein said second-named funnel contains a detachable dust cover for preventing rain water from settling on the tray of insecticide therebelow and for preventing the insects interiorly of the enclosure from escaping therefrom.

5. The structure of claim 1 and further including a pair of spaced legs rotatively secured to the exterior of the lower portion of the enclosure and adapted to be rotated outwardly and downwardly in parallel relation to preselected positions to maintain the enclosure in level position on a hillside of moderate or steep slope.

6. The structure of claim 1 wherein a side of the enclosure contains an opening, and an access door is hinged to an edge of the opening to selectively cover the opening thereby providing access to the trap interior to clean and service the same.

7. The structure of claim 1 wherein said liquid insecticide means comprises a tray of kerosene disposed directly below said deflector means in spaced relation thereto.

8. The structure of claim 1 wherein said liquid insecticide means comprises a plurality of trays of liquid insecticide disposed at different levels in coacting spaced relation to said deflector means.

9. The structure of claim 1 and further including trap mounting means secured to the exterior of the enclosure for rigidly mounting the trap in level position on an associated hillside of slight or steep slope.

10. The structure of claim 9 wherein said trap mounting means comprises a pair of spaced, oppositely disposed legs rotatably and adjustably mounted on the enclosure adjacent one side thereof for rotation to preselected vertical positions thereon whereby selective rotative positioning of each of the legs will maintain the trap in level position on a hillside of slight or steep slope.

11. The structure of claim 1 wherein said deflector means includes an inverted funnel disposed above the liquid insecticide means in coacting spaced relation thereto.

12. A yellow jacket trap for trapping and killing yellow jackets comprising; a rectangular-shaped screened enclosure including a floor, roof and side walls; said floor having an opening for admitting yellow jackets to the interior of the enclosure; one of said side walls including an access door to provide access to the enclosure interior for cleaning and servicing the same; at least one tray of insecticide disposed interiorly of the enclosure for receiving yellow jackets therein; and upstanding deflector means interiorly of the enclosure and disposed in spaced relation to the floor opening and adjacent to the tray for deflecting yellow jackets in flight into the tray of insecticide.

13. The structure of claim 12 wherein the tray contains a liquid insecticide consisting of kerosene.

14. The structure of claim 12 wherein said deflector means includes a funnel disposed in inverted position above at least one of said trays.

15. The structure of claim 14 wherein said funnel is secured to and extends through the roof of the enclosure and a second funnel is secured in upright position to the first-named funnel in coacting relation therewith to provide a pouring spout for filling the tray therebelow with liquid insecticide.

16. The structure of claim 12 and further including a pair of parallel-spaced rotatively adjustable legs, one of said legs being rotatively secured at a point adjacent one of its ends to a corner of the enclosure, the other of said legs being rotatively secured at a point adjacent one of its ends to a second corner of the enclosure adjacent said first-named corner, said legs being mounted on the enclosure in rotative parallel spaced coacting relation for rotative movement in respective vertical planes at right angles to the side of the enclosure between said corners, and means for maintaining said legs in predetermined rotative positions whereby the trap may be placed in level position on a hillside of substantial slope.

17. A yellow jacket trap for trapping and killing yellow jackets comprising a rectangular-shaped screened enclosure including a floor, roof and side walls; said floor having an opening for admitting and trapping yellow jackets to the interior of the enclosure; one of said side walls having an opening and having an access door selectively covering said second-named opening to provide access to the enclosure interior for cleaning and servicing the same; a plurality of trays containing kerosene disposed interiorly of the enclosure at different levels for receiving yellow jackets therein; a funnel secured to and extending through the roof in inverted position adjacent at least one of said trays for deflecting the trapped yellow jackets in flight into the trays; and liquid conduit means between two or more trays disposed at different levels for channeling kerosene from an upper tray to a lower tray when the level of kerosene in the upper tray reaches a predetermined point.

18. A method of trapping and killing yellow jackets comprising, providing a screened enclosure having an opening for admitting yellow jackets thereinto, placing the enclosure directly over an associated yellow jacket nest so that the enclosure opening is over the nest entrance, providing exposed liquid insecticide means interiorly of the trap, and providing deflector means above the liquid insecticide means whereby yellow jackets fly through the enclosure opening thence off the deflector means and into the liquid insecticide means.

19. A method of trapping and killing yellow jackets comprising, providing a rectangular screened enclosure having a lower opening for admitting yellow jackets thereinto, placing the enclosure over an associated yellow jacket nest whereby the enclosure opening is directly over the nest entrance, providing a plurality of trays of kerosene at different levels interiorly of the enclosure, and providing at least one funnel disposed in inverted position interiorly of the enclosure and over at least one of said trays whereby yellow jackets fly through the enclosure opening thence off the inverted funnel and into one of the trays of kerosene.

References Cited by the Examiner

UNITED STATES PATENTS

| | | | |
|---|---|---|---|
| 1,057,291 | 3/1913 | Smith | 43—118 |
| 1,277,527 | 9/1918 | Allen | 43—118 |
| 1,703,322 | 2/1929 | Rummel | 43—118 |
| 1,882,380 | 10/1932 | Braun | 43—107 |
| 2,037,852 | 4/1936 | Dallar | 43—118 |
| 2,046,430 | 7/1936 | Rutherford | 43—107 |
| 2,193,492 | 3/1940 | Richardson | 43—107 |

FOREIGN PATENTS 13,503    7/1911    *Great Britain.*

SAMUEL KOREN, *Primary Examiner.*

ALDRICH F. MEDBERY, *Examiner.*